United States Patent [19]

Henderson

[11] Patent Number: 4,713,554

[45] Date of Patent: Dec. 15, 1987

[54] EXTENDED RANGE REGULATED POWER SUPPLY

[75] Inventor: Ross Henderson, North Reading, Mass.

[73] Assignee: Powercube Corporation, Billerica, Mass.

[21] Appl. No.: 851,227

[22] Filed: Apr. 14, 1986

[51] Int. Cl.$^4$ .............................................. H02J 9/00
[52] U.S. Cl. .............................................. 307/64
[58] Field of Search ............... 307/64, 65, 66; 363/41, 363/65, 67, 125, 129

[56] References Cited

U.S. PATENT DOCUMENTS 3,098,963  7/1963  Michaelis ........................... 363/125
4,488,057  12/1984  Clarke .................................. 307/66

Primary Examiner—William M. Shoop, Jr.
Assistant Examiner—Richard K. Blum
Attorney, Agent, or Firm—Weingarten, Schurgin, Gagnebin & Hayes

[57] ABSTRACT

An extended range regulated power supply which provides a constant output despite extreme variations in line potential, which in the present embodiment may exceed 50%. The power supply maintains high efficiency by operating with a first unregulated supply voltage just above the minimum voltage required by the linear regulator to maintain the desired output voltage. Upon severe low line or drop-out conditions, a second unregulated voltage supply is connected to the input of the linear regulators to maintain constant output voltage. Both of the unregulated potentials are derived from a transformer wherein the second unregulated source will be at least the voltage necessary for the regulators to maintain the desired output voltage under the maximum line drop-out voltage. The standby unregulated potential is switched by a solid state (FET) switch which acts instantaneously to provide a continuity of output voltage and may be configured to selectively switch in a range of standby potentials as well as a proportional pulse configured to provide modulated switching action.

5 Claims, 4 Drawing Figures

SINGLE PHASE VERSION

1

EXTENDED RANGE REGULATED POWER SUPPLY

FIELD OF THE INVENTION

The present invention relates to power supplies and, in particular, to power supplies having high line regulation and are operable under severe low line or dropout conditions.

BACKGROUND OF THE INVENTION

A regulated power supply typically includes a transformer and rectifier to first provide an unregulated output which is thereafter regulated by either a switching or a series linear regulator. In the power supply which includes a linear regulator, there is a minimum unregulated voltage which must be provided, typically two to three volts above the desired regulated output potential. Under normal load conditions (which would serve to deplete the storage capacitors in the power supply when not fully driven by the line), minor variations in line potential, and therefore unregulated power supply voltage is tolerated by merely increasing the unregulated voltage so that it remains above the minimum required by the regulators at all times, including the times of minor line voltage drop-out. However, to increase the power supply tolerance to line voltage drop-out, the magnitude of the nominal unregulated power supply voltage is also increased which requires the regulator to dissipate a greater portion of power and thus reduces power supply efficiency. Therefore, the requirements of high efficient power supplies and toleration of line drop-out heretofor been viewed as mutually exclusive.

Attempts to increase the efficiency of power supplies include preceding the unregulated power supply with a switching regulator; however, the resulting power supply requires a finite response time in order to respond and provide the required unregulated voltage for the subsequent linear regulator, which may exceed that tolerable by the linear regulator, resulting in a drop in the desired regulated output voltage. Moreover, the addition of the switching power supply has its own detrimental effect on overall power supply efficiency. A further limitation in this approach lies in the addition cost of and size of the semiconductor switching circuitry hardware.

SUMMARY OF THE INVENTION

The present invention provides an efficient linear regulated power supply which comprises a primary and a secondary (backup) unregulated power potential and electronically controlled switch to engage the backup power source during a sensed period of drop-out or excessively low line voltage. In normal operation, the regulated output is provided by a linear regulator whose supply potential is derived from the primary unregulated source, having an unregulated voltage normally a few volts above the desired output voltage. The present invention includes an electronically controlled switch which determines when the drop-out condition is of sufficient magnitude so that the primary unregulated power source is insufficient to supply the regulators with the minimum input power, and thereafter connects the backup power source to the power supply regulators. After the power line returns to within the nominal operating voltage, the backup unregulated supply is disconnected, allowing the normal unregulated supply to again supply the regulators with the input power.

The secondary potential is derived from additional power transformer secondary windings which provide an unregulated potential of sufficient magnitude to provide the necessary regulator drive voltages under time of maximum line drop-out conditions. The present invention is also configurable to include multiple backup power supplies each of a different potential to provide an incremental step engagement of backup unregulated power supply potential according to the degree of line drop-out. Furthermore, the electronically controlled switch may also be configured to proportionally engage the backup power source to add the secondary power supply potential to the normal operating unregulated potentional according to the degree of line drop-out.

BRIEF DESCRIPTION OF THE DRAWING

These and further features of the present invention can be further understood by reading the following description, taking together with the drawings wherein.

DETAILED DESCRIPTION OF THE INVENTION

Figure 1:
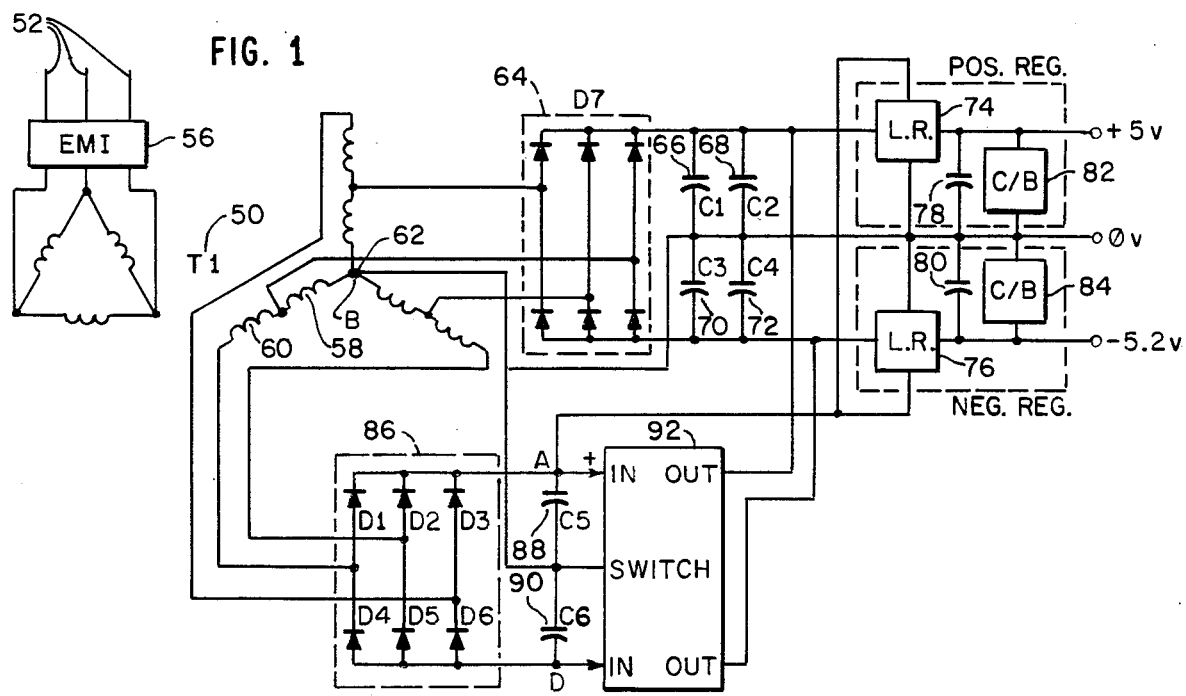
FIG. 1 is a schematic diagram of a three-phase embodiment according to the present invention.

The present invention shown in FIG. 1 comprises a regulated power supply adapted to receive a three-phase input on leads 52 which are connected to the corresponding three-phase primary winding of a transformer 54 through a line filter 56 which reduces the electrical interference induced on the power leads 52 by the power supply 50. The secondary windings of transformer T1 comprise three legs each having a first 58 and a second 60 widing portion. The three legs are connected in a "Y" configuration having the center point 62 connected to the neutral output or zero voltage return. The first section 58 of each winding leg is connected to a three-phase rectifier 64 which provides a positive and negative output potential which is received by capacitors 66, 68, 70 and 72 for the respective plus and minus potentials. Series pass regulators 74 and 76 receive the unregulated positive and negative potentials, respectively. The linear regulators 74 and 76 provide the desired output potentials and are high frequency bypassed by capacitors 78 and 80. Furthermore, the power supply also includes crowbar (over voltage) protection circuits 82 and 84 which monitor the respective output potentials for excessive output voltage. Upon detection of excessive output voltage, the crowbars provide short circuit to the regulator output terminals until the input voltage is removed.

The second portion 60 of each transformer 54 secondary leg is connected to the high end of the first portion 58 to yield a higher potential relative to the center point 62, and is received by a second three-phase rectifier 86 which provides corresponding positive and negative potentials to capacitors 88 and 90, respectively. The capacitors 88 and 90 are selected to provide adequate energy storage under load conditions and the winding 60 is selected to provide additional secondary output so that the resulting potential across capacitors 88 and 90 under the most severe drop-out conditions of the signal received on input line 52 is sufficient for operation of the regulators 74 and 76. Typically, linear regulators such as series pass type regulators require an input potential of two to three volt in excess of the desired regulated output voltage (across output capacitors 78 and 80) for proper operations. Therefore, the desired voltage across capacitors 88 and 90 under worst case conditions should be at least two to three volts greater in magnitude than each respective power supply output voltage.

An electrically controlled switch 92 is connected to provide the positive and negative potentials from the rectifier 86 to the respective rectifier 64 leads upon the detection of a reduction in unregulated potential resulting from a low line or drop-out condition on the input power and is discussed in greater detail with regard to FIG. 2 below.

Figure 2:
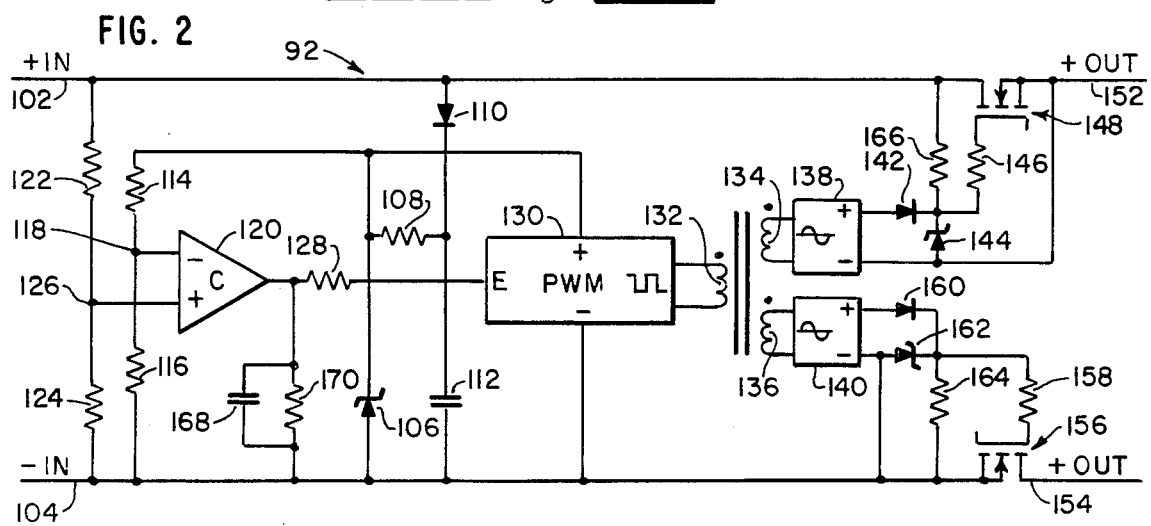
FIG. 2 is a schematic diagram of the switch element of FIG. 1.

The electronically controlled switch 92 is shown in greater detail in FIG. 2 wherein the power from the capacitors 88 and 90 comprising a secondary backup, unregulated power source is received on the positive and negative leads 102 and 104, respectively. Since the potential across these leads is unregulated, a stabilized potential is created by diode 106 in conjunction with resistor 108, diode 110 and bypass capacitors 112. The resulting stabilized potential is received by resistors 114 and 116 which forms a voltage divider and therefore provides a constant proportion at the junction 118, which is received by one terminal of a comparator 120. A second voltage divider is formed across the input leads 102 and 104 by resistors 122 and 124 which provides a constant proportion of the unregulatd (variable) input voltage. The comparator 120 compares a constant voltage developed at point 118 with a proportion of the unregulated input voltage at point 126 and provides a change in state at its output when the proportional unregulated input at point 126 exceeds that of the stabilized reference at point 118, producing a logical high. The resulting enable signal operates as a control signal for a driver circuit 130 and is received through resistor 128. The driver circuit 130, comprising integrated circuit number UC1525 by Unitrode Corporation in the present embodiment, is enabled by logical low signal, corresponding to the signal at point 126 being less than signal at point 118. When enabled, the driver circuit 130 provides an AC drive signal to the primary 132 of a transformer, the secondary 134 and 136 producing electrically isolated signals which are received by rectifier circuits 138 and 140, respectively. The drive signals are provided by the output of the rectifier circuits 138 and 140, which is received through diodes 142 and 160.

The received unregulated input of leads 102 and 104 are connected to the corresponding output leads 152 and 154 by power field effect transistors (FET) 148 and 156, respectively, and are turned on with a voltage to resistors 146 and 158, respectively. The signals are each limited by zener diodes 144 and 162 so that the resulting voltage does not exceed the maximum gate source-voltage of the FET devices 148 and 156, typically in the order of 15 volts. When the line signal returns to normal potential levels, the voltages received by comparator 120 cause the comparator to discontinue, disabling the driver circuit 130 from energizing each of the FET switch devices 148 and 156. However, the typical FET gate-to-source capacitance provides unwanted storage of the turn-on signal, which can be dissipated with additional resistors 164 and 166 and thus aid in circuit turn-off time.

In the preferred embodiment, by selection of the series resistor 128 and bypass capacitor 168 and corresponding resistor 170, the circuit is designed to provide a singular stepwise enablement of the FET switches 148 and 156 as the power line potential drops. However, in view of the typical (non-ideal) parameters of most available transformers (such as for transformer 54), the electronically controlled switch circuit 92 may be designed to provide an intermittent switching of devices 148 and 156 as the input potential passes through the threshold range when the backup potential is supplied. This is implemented by replacing the detector IC with an ocsilator that will turn the PWM IC on and off at a rate that would provide a DC voltage between the first and second unregulated voltage. The resulting value would be proportional to the duty cycle.

Figure 3:
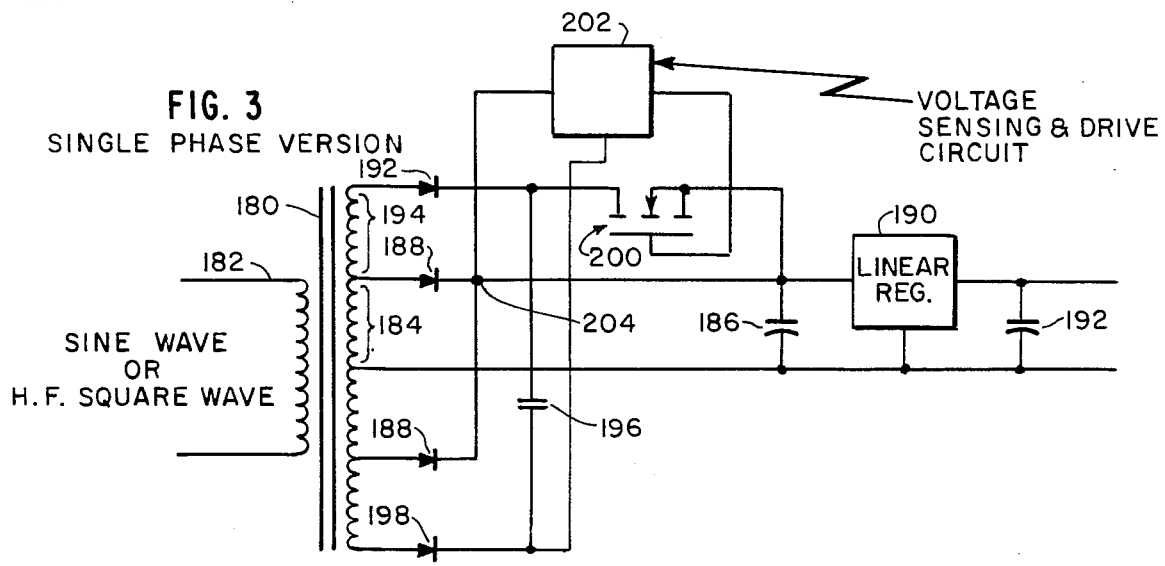
FIG. 3 is a single-phase embodiment of the present invention.

A further advantage of the present invention is that it is operable in a single phase embodiment such as shown in more detail in FIG. 3. A transformer 80 receives an AC signal on its primary 182 which may comprise a sine wave or a high frequency square wave signal. The secondary comprises a first portion 184 located symmetrically about a center top which provides a normal unregulated supply potential across capacitor 186 via rectifier diodes 188. The resulting unregulated potential is received by regulator 190 which provides a desired regulated across bypass capacitor 192. An additional secondary portion 194 augments the AC voltage produced across section 184 to provide a standby unregulated potential across capacitor 196 to diode 198. The resulting unregulated standby potential is applied to the input of the regulator 190 by FET switching device 200 and is controlled by a voltage sensing and drive circuit 202 according to a signal which is representative of the input for primary drive signal. In this embodiment, the representative input signal is derived from the normal operation of regulators supply potential at point 204.

Figure 4:
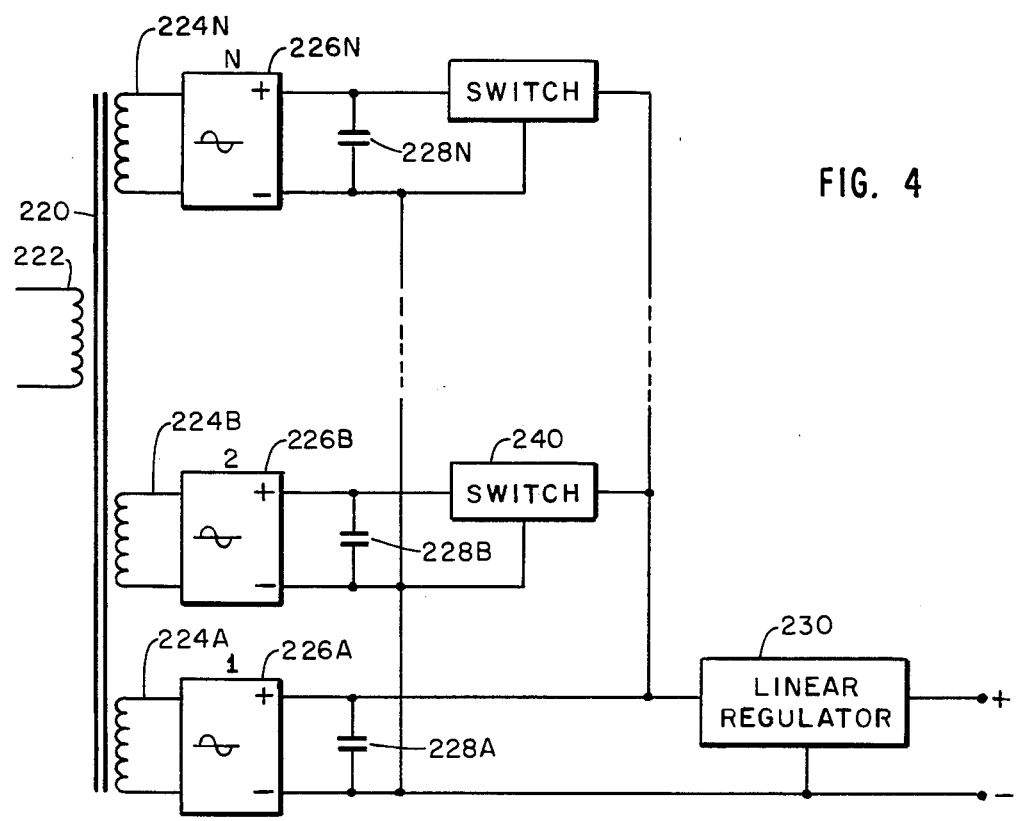
FIG. 4 is a single-phase embodiment of the present invention including sequentially engaged multiple secondaries.

The present invention may be expanded to include multiple additional secondary portions to provide a range of incremental augmentation to the unregulated supply received by the regulator, as shown in FIG. 4. The transformer 220 includes a primary winding 222 and several secondary windings 224A, 224B–224N, having progressively increasing voltages. The secondary voltages are rectified by corresponding bridge rectifiers 226A, 226B . . . 226N, the resulting voltage being filtered by capacitors 228A, 228B . . . 228N. Under normal primary 222 voltage conditions, secondary 224A provides appropriate unregulated voltage at the input to the linear regulator 230 to provide the desired regulated output voltage as discussed above. As the primary 222 voltage diminishes, switch 240 connects the DC voltage from secondary 224B to the input of the regulator 230 according to a predetermined threshold of switch 240, which comprises a single polarity circuit similar to that shown in FIG. 2. As the primary 222 voltage continues to decrease, successive DC voltages are engaged through corresponding switches, up to the switch 250 which engages the last secondary 224N DC voltage, which under normal primary voltages, has the highest potential.

Other embodiments, substitutions or variations of the present circuit and method made by one skilled in the art are within the scope of the present invention. Therefore, the present invention is not to be limited except by the claims which follow.

What is claimed is:

1. A power supply for use with a unregulated input supply comprising:
   a first means for receiving said unregulated input supply providing a first output;
   a second means for receiving said unregulated input supply providing a second output;
   a voltage regulator for receiving said first output at an input and providing a regulated output;
   means for detecting a drop-out in said unregulated input supply potential and providing a control output signal in response to the drop-out in unregulated supply potential; and
   a switch to selectively provide said second output to said voltage regulator input upon receipt of said control signal permitting said voltage regulator to continuously maintain a regulated output.

2. The power supply of claim 1 wherein said switch comprises:
   an electronic semiconductor switch; and
   means to energize said electronic semiconductor switch upon receipt of said control signal.

3. The power supply of claim 1 wherein said means to detect a drop-out comprises:
   reference means providing a threshold potential; and
   comparator means receiving said threshold potential and a signal proportional to one of said first potential and said second potential.

4. The power supply of claim 1 wherein said control signal comprises a pulse width modulated signal.

5. The power supply of claim 1 wherein:
   said first and second means for receiving said unregulated input supply include a transformer having a secondary winding having at least one tap thereon to provide a plurality of secondary voltage.

* * * * *

UNITED STATES PATENT AND TRADEMARK OFFICE
CERTIFICATE OF CORRECTION

PATENT NO. : 4,713,554
DATED : December 15, 1987
INVENTOR(S) : Ross Henderson

It is certified that error appears in the above-identified patent and that said Letters Patent is hereby corrected as shown below:

Column 1, line 33, "heretofor" should read --heretofore--
          line 45, "addition" should read --additional--

Column 2, line 16, "potentional" should read --potential--

Column 3, line 28, "bypass capacitors 112." should read --bypass capacitor 112.--
          line 35, "unregulatd" should read --unregulated--

Column 4, lines 15-16, "ocsil- lator" should read --oscil- lator--
          lines 30-31, "provides a desired regu- lated across" should read --provides a desired regu- lated potential across--
          line 47, "224B-224N," should read --224B ... 224N,--
          line 61, "successive DC" should read --successive secondary DC--

Signed and Sealed this

Twenty-fifth Day of April, 1989

Attest:

DONALD J. QUIGG

Attesting Officer     Commissioner of Patents and Trademarks